United States Patent [19]
Fischer et al.

[11] Patent Number: 5,821,881
[45] Date of Patent: Oct. 13, 1998

[54] DATA INPUT BY MEANS OF A KEYBOARD AND A TOUCH-SENSITIVE GRAPHICAL DATA INPUT FIELD

[75] Inventors: Wolfgang Fischer, Boblingen; Heinz Gnter Horbach, Gechingen, both of Germany

[73] Assignee: International Business Machines Corporation, Armonk, N.Y.

[21] Appl. No.: 694,730

[22] Filed: Aug. 9, 1996

[30] Foreign Application Priority Data

Aug. 10, 1995 [DE] Germany ................. 195 29 454.8

[51] Int. Cl.[6] ........................................... G06K 9/00
[52] U.S. Cl. ..................... 341/22; 341/34; 364/709.11; 364/709.12
[58] Field of Search ................. 341/20, 26, 23, 341/34; 364/709.1, 709.11, 709.12; 345/168, 173, 340

[56] References Cited

U.S. PATENT DOCUMENTS

| | | | |
|---|---|---|---|
| Re. 34,476 | 12/1993 | Norwood | 382/13 |
| 4,644,326 | 2/1987 | Villalobos et al. | 341/34 |
| 4,831,218 | 5/1989 | Wright | 341/34 |
| 4,899,137 | 2/1990 | Behrens | 345/168 |
| 5,450,078 | 9/1995 | Silva | 341/23 |
| 5,579,002 | 11/1996 | Iggulden et al. | 341/23 |
| 5,706,030 | 1/1998 | Ishigami | 345/168 |

FOREIGN PATENT DOCUMENTS

WO 94/19736   9/1994   WIPO .

*Primary Examiner*—Michael Horabik
*Assistant Examiner*—Albert K. Wong
*Attorney, Agent, or Firm*—Norman L. Gundel

[57] ABSTRACT

A data processing system is provided for emulating keyboard input. In one embodiment, the invention provides a contact sensitive graphical data input-output field for receiving graphical user input and for displaying graphical output. The graphical data input-output field includes multiple contact sensitive data input fields. The embodiment also provides a keyboard overlying the graphical data input-output field. The keyboard includes multiple keys, each of which corresponds to a data input field of the graphical data input-output field. Each key, when pressed by a user, contacts the data input field that corresponds to that key, thereby causing the data processing system to provide an electrical signal of a predetermined value that corresponds to the key pressed by the user. The keyboard further includes a window through which at least a portion of the graphical data input-output field can be viewed when the keyboard is fully overlying the graphical data input-output field, wherein the portion of said graphical data input-output field that can be viewed through the window can display graphical output.

3 Claims, 1 Drawing Sheet

DATA INPUT BY MEANS OF A KEYBOARD AND A TOUCH-SENSITIVE GRAPHICAL DATA INPUT FIELD

BACKGROUND OF THE INVENTION

1. Field of the Invention

The present invention relates to the input of data by means of a keyboard and a graphical data input field.

2. Description of the Related Art

The term "data acquisition" is understood to mean work processes by means of which data that come into being are brought into a (preferably) machine-readable form, and stored on data carriers. In the modern world of data processing, this purpose is served by a series of input devices which bring the data to be processed or a program into the memory of the central processing unit. The results obtained there can be passed on subsequently to output devices provided for this purpose. In this instance, the external presentation of information depends essentially on the data carrier which is used. The input and output devices must transform the information into the internal presentation (electrical signals) or vice-versa. Single devices may be used both for input and output. This applies in particular to the peripheral memories, but also to the devices which are used for direct communication between a user and the computer.

Nowadays, a series of different input devices are available for data input. For example, data may preferentially be entered via a keyboard or via graphical input devices. The term "keyboard" is used to group together input devices for computers and the like which consist of a typewriter keyboard or have been modified from such a keyboard. Pressure on a key brings about a change in the status of the computer, and optionally triggers certain sequences of commands. A keyboard is frequently coupled to a screen, on which sequences of characters entered are displayed directly.

Over and above the keyboards used in alpha-numeric data processing, use is made of graphical input devices for interaction in graphical data processing. In the case of the graphical input devices, a distinction must be drawn between those input devices which are solely to be used for positioning and identifying objects, and those graphical input devices which allow direct graphical data input. The last-named graphical input devices include, in particular, the so-called tablets and the touchscreens. In the case of a touchscreen, a film is positioned preferably on a screen or another device on its surface, in order to permit determination of the pressure position of the finger or of a writing implement, such as a pen. The recognized pressure position is processed by means of an image graphics system, and depending on the application, it can either be retained as a graphic or can be available for text and/or image recognition.

Frequently, a series of different data input devices are made available in parallel for a data input. Hence alpha-numeric data input devices such as keyboards are combined with graphical data input devices in order to make the data input easier. For example, from International Patent Application WO94/19736, a combined data input and data output device of this sort is known. FIG. 12 of this Application shows a portable data input and output device with a keyboard for an alpha-numeric input and a graphical data input device. In this case, the graphical data input device consists of a touchscreen and a special pen for graphical data input by means of this touchscreen. Although an alpha-numeric data input can also be emulated or performed with a graphical data input device, these devices are nevertheless generally designated as graphical data input devices in accordance with their basic function.

SUMMARY OF THE INVENTION

The object of the invention is to create a further data acquisition device which enables a combined graphical and alpha-numeric input. The object of the invention is accomplished by the characteristics of the independent claims.

In accordance with the invention, a data input is effected by means of a keyboard and a data input field for graphical data input by positioning the keyboard on the graphical data input field in such a way that a contact, which is created between the keyboard and the data input field when the keyboard is actuated, is transformed into a signal by the data input field.

Further advantageous embodiments of the invention are to be found in the dependent claims.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

While the invention will be described in connection with a preferred embodiment, it will be understood that the description is not intended to limit the invention to that embodiment. On the contrary, the invention is intended to cover all alternatives, modifications and equivalents as may be included within the spirit and scope of the invention as described by the appended claims.

DETAILED DESCRIPTION OF THE INVENTION

Figure 1:
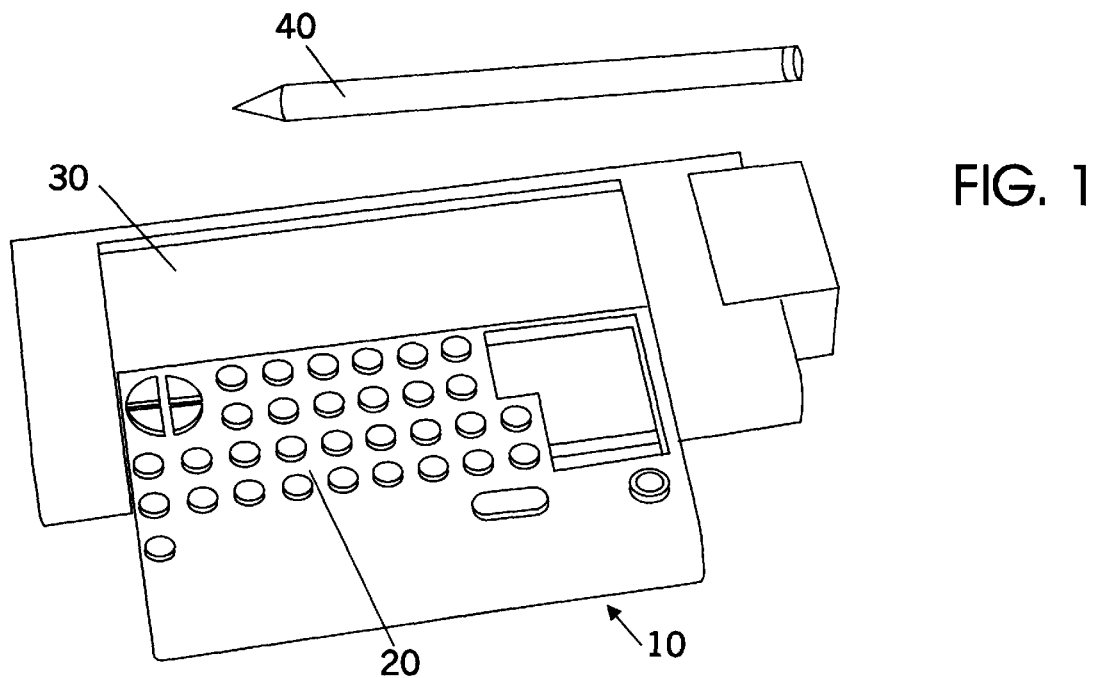
FIG. 1 shows a data input device in accordance with the invention.

FIG. 1 shows a data input device 10 in accordance with the invention. The data input device 10 features a keyboard 20 for alpha-numeric data input, and a graphic data input field 30 for graphical data input. For the graphical data input, use is preferably made of a pen 40. As can be seen from FIG. 1, the keyboard 20 is capable of a sliding movement over the data input field 30, for example by means of appropriate slide tracks at the edges.

Figure 2:
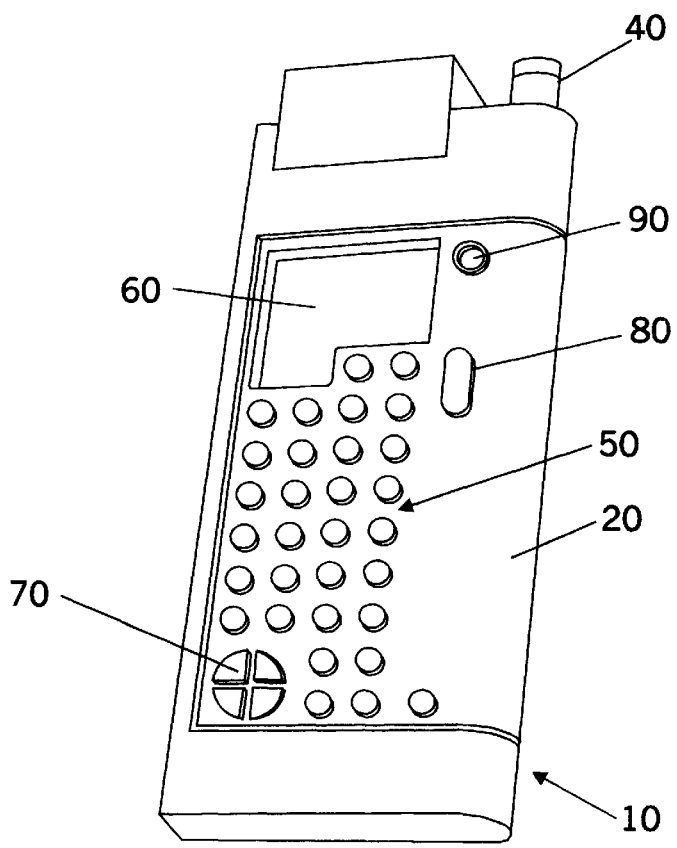
FIG. 2 shows a data input mode for a data input via the keyboard.

FIG. 2 shows a first data input mode of the data input device 10 for data input via the keyboard 20. In this first data input mode, the keyboard 20 is positioned above the data input field 30. To secure this arrangement mechanically, the pen 40 may, for example, mechanically lock any displacement of the keyboard 20, as shown in FIG. 2. The keyboard 20 features a large number of keys 50, and when these keys 50 are actuated, they create a contact with the data input field 30. During this first data input mode, the data input field 30 is pre-set or programmed in such a manner that whenever there is a contact between any one of the large number of keys 50 and a corresponding point on the data input field 30, a pre-specified value is assigned to the corresponding key which has been pressed. In other words, the data input field 30 is programmed in this first data input mode so that a keyboard input is emulated by means of the contact of the keys 50 with the data input field 30. In this instance, the data input field 30 transforms the contacts made by pressing the keyboard 50 into defined electrical signals, to which any desired values may be assigned by means of prior programming.

The data output, or the display of the data input in FIG. 2, is effected with the help of a window 60, which leaves part of the data input field 30 clear, or allows it to be viewed. This means that the data input field 30 can be used simultaneously for data input and for data output. Sections or sub-areas of the data input field 30 may also be pre-selected either for pure data input, for data output or for combined data input and output. The window 60 preferably consists of a transparent panel which makes it possible to view the data input field 30 even in a mode where keyboard input is blocked.

As can be seen in FIG. 2, the keys 50 may feature different function keys. Hence, control keys 70 (cursor) allow positioning for the data input. A confirmation key 80 permits confirmation of the data input. An on-off switch 90 in turn permits activation and/or deactivation of the input via the keyboard 20, or preselection of the data input mode. Any desired key functions are feasible here, depending on the particular application. It is also possible to assign fixed values to the keys 50; these values are then, for example, imprinted on these keys 50. However, the keys 50 may also be freely programmable. In this case, the method of functioning for any particular key of the large number of keys 50 is preferably indicated by means of specially programmable display keys. These display keys contain a display field, which makes the function assignment of the said display keys visible.

FIG. 1 represents the second data input mode of the data input device 10. The keyboard 20 which is moveable above the data input field 30 is moved or folded away here in such a manner that direct data input via the data input field 30 is rendered possible. Depending on the functionality of the data input field 30, various different methods of data input are possible here. Hence, the data input field 30 can be programmed in such a way that a data input can be effected by means of the pen 40. Analogously to this method, however, a data input may also be effected by touching the data input field 30, for example with the finger. In this case, the data input field 30 can be programmed in such a manner that the data input which has taken place is interpreted either on the basis of dots or on the basis of fields. In the case of an input on the basis of dots, each contact dot of the data input field 30 is assigned to one or more image dots, depending on the resolution of the data input field 30. In the case of an input on the basis of fields, when an area within a defined field is touched, the value assigned to the respective field is selected.

In the second data input mode, the data input field 30 can be used for a graphical data input in any manner desired. With the help of this data input field 30, it is also possible to emulate a direct keyboard input (without using the keyboard 20). In this case, values are displayed on the individual fields of the data input field 30 which are selected when these fields are touched. It is preferable for alphanumeric values to be assigned to these values.

The data output, or display of the data input in the second data input mode, which is shown in FIG. 1, is preferably effected via the data input field 30 as well. In this instance, the data input field 30 allows combined input and presentation of data.

To separate the different data input modes (FIG. 1 and FIG. 2), the data input device 10 preferably features electrical contacts, which are activated by the keyboard 20 when the latter is moved. The coincidence of the individual data input modes can be ensured by an appropriate spatial arrangement of these electrical contacts. It is also possible for an electrical contact to be activated by the mechanical locking, in such a way that an input via the keyboard 20 is only possible when complete mechanical locking takes place, as shown in FIG. 2.

Thanks to a corresponding mechanical design, the keyboard 20, as shown in FIG. 1, can actually be displaced so far that a direct data input on to the data input field 30 is made possible, although the keyboard 20 is not separated from the data input device 10, or is only separated from it after a further unlocking operation. This guarantees compact handling of the data input device 10, in particular for the mobile field of application.

The separation of the data input modes in accordance with the invention, as shown in FIG. 1 and FIG. 2, may be preferentially used in mobile data input devices; however, it is not restricted to these devices, and may also be used for data input devices which are installed in a fixed position.

A further aspect of the invention is evident in the fact that the locking of the data input field 30, as shown in FIG. 2, results in a protective effect against mechanical stresses and contamination of the data input field 30. Since the data input field 30 makes use of multi-plane glass panels or the like, it is particularly sensitive to impacts, and it can thus be effectively protected by the keyboard 20.

For the data input field 30, use may be made in particular of the so-called touchscreens, for example resistive or capacitive touchscreens. For the keyboard 20, it is preferable to make use of spring-mounted pressure keys or the like.

When selecting the pen 40, particular attention must be paid to the surface design and/or the surface roughness of the data input field 30. In this instance, the surface of the data input field 30 and also the surface of the pen 40 should be coordinated with one another in such a way that fluent writing is guaranteed, corresponding to the way the user is accustomed to write on a piece of paper. To improve the mechanical stability, the pen 40 may also be positioned for the locking (illustrated in FIG. 2) in such a way that it is completely accommodated by the data input device 10. This reduces the danger that the pen 40 can be broken off or sheared off.

By way of example, the invention is used for data input in the so-called "delivery service". Hence, the keyboard input with the help of the keyboard 20, as shown in FIG. 2, allows reliable input of the requisite data, such as the order address or the delivery data, whilst (for example) a signature for the receipt of goods can be acknowledged with the help of the direct graphic data input by way of the data input field 30 and the pen 40.

While the invention has been particularly shown and described with reference to a preferred embodiment and process, it will be understood that various changes in form and detail may be made therein without departing from the spirit and scope of the invention.

What is claimed is:

1. A data processing system for inputting data, comprising:

a contact sensitive graphical data input-output field for receiving graphical user input and for displaying graphical output; and a keyboard overlying the graphical data input-output field, the keyboard including multiple keys, each of which keys, when pressed by a user, contacts a predetermined area of the graphical data input-output field, thereby causing the data processing system to provide an electrical signal corresponding to the key pressed by the user, the keyboard further including a window through which at least a portion of the graphical data input-output field can be viewed when the keyboard is in a position fully overlying the graphical data input-output field.

2. The data processing system of claim 1, wherein the portion of said graphical data input-output field that can be viewed through the window can display graphical output.

3. A data processing system for emulating keyboard input, comprising:

a contact sensitive graphical data input-output field for receiving graphical user input and for displaying graphical output, including multiple contact sensitive data input fields; and a keyboard overlying the graphical data input-output field, the keyboard including multiple keys, each of which keys corresponds to a data input field of the graphical data input-output field, and each of which keys, when pressed by a user, contacts the data input field that corresponds to that key, thereby causing the data processing system to provide an electrical signal of a predetermined value, which value corresponds to the key pressed by the user, and wherein said keyboard further includes a window through which at least a portion of said graphical data input-output field can be viewed when said keyboard is in a position fully overlying said graphical data input-output field, wherein the portion of said graphical data input-output field that can be viewed through the window can display graphical output.

* * * * *